United States Patent
Ross

(10) Patent No.: US 7,897,230 B2
(45) Date of Patent: Mar. 1, 2011

(54) ONE-WAY VISION DISPLAY PANELS WITH RETENTION LAYER

(75) Inventor: Gregory Ross, Santa Rosa, CA (US)

(73) Assignee: Clear Focus Imaging, Inc., Santa Rosa, CA (US)

(*) Notice: Subject to any disclaimer, the term of this patent is extended or adjusted under 35 U.S.C. 154(b) by 312 days.

(21) Appl. No.: 11/790,972

(22) Filed: Apr. 30, 2007

(65) Prior Publication Data

US 2008/0268142 A1    Oct. 30, 2008

(51) Int. Cl.
*B32B 33/00* (2006.01)

(52) U.S. Cl. .......... 428/41.8; 428/40.1; 428/42.1; 428/131; 428/137; 428/138; 40/594

(58) Field of Classification Search .......... 428/913.3, 428/203, 137, 138, 40.1, 40.2, 40.3, 40.4, 428/40.5, 40.6, 40.7, 40.8, 40.9, 41.1, 41.3, 428/41.6, 41.7, 41.8, 42.2, 42.3, 343, 354; 40/594

See application file for complete search history.

(56) References Cited

U.S. PATENT DOCUMENTS

| | | | | |
|---|---|---|---|---|
| 4,877,678 | A * | 10/1989 | Hasegawa et al. | 428/32.25 |
| 5,679,435 | A * | 10/1997 | Andriash | 428/137 |
| 5,830,529 | A * | 11/1998 | Ross | 427/152 |
| 5,925,437 | A * | 7/1999 | Nelson | 428/137 |
| 6,242,076 | B1 * | 6/2001 | Andriash | 428/138 |
| 6,258,429 | B1 * | 7/2001 | Nelson | 428/42.1 |

OTHER PUBLICATIONS

Kirwan, Mark J., Paper and Paperboard Packaging Technology, Oct. 2005, Blackwell Publishing, p. 45.*

* cited by examiner

*Primary Examiner* — David R Sample
*Assistant Examiner* — Walter Moore
(74) *Attorney, Agent, or Firm* — Andrews Kurth LLP

(57) ABSTRACT

One or more types of ink retention layers for a one-way vision display panel and methods are provided. In one example, a one-way vision display panel assembly includes a perforated panel formed of a flexible material. The perforated panel having a front surface, a rear surface and a plurality of through holes extending from the front surface to the rear surface. An ink retention layer is located adjacent to the perforated panel. The ink retention layer includes material that retains or absorbs residual ink from an image applied to the front surface of the perforated panel. The one-way vision display panel may further include a releasing layer or a backing layer, or both.

17 Claims, 10 Drawing Sheets

ONE-WAY VISION DISPLAY PANELS WITH RETENTION LAYER

TECHNICAL FIELD

The present invention relates to one-way vision display panels, specifically to panels having a ink retention layer.

BACKGROUND OF THE INVENTION

Perforated one-way vision display panels are used for displaying images on one side of the one-way vision display panel and are see-through when viewed from the opposite side. One-way vision display panels may be mounted on, for example, windows of a bus or a building. One-way vision display panels may be used for advertising or other information dissemination purposes.

Ink applied to a surface of the perforated one-way vision display panel assembly can penetrate through the holes of the panel. The residual ink can settle inside the holes and/or the solvents in the ink may weaken the adhesive used to attach the one-way assembly to a surface.

SUMMARY OF THE INVENTION

One or more types of ink retention layers for a one-way vision display panel and methods are provided. In one example, a one-way vision display panel assembly includes a perforated panel formed of a flexible material. The perforated panel having a front surface, a rear surface and a plurality of through holes extending from the front surface to the rear surface. An ink retention layer is located adjacent to the perforated panel. The ink retention layer includes material that retains or absorbs residual ink from an image applied to the front surface of the perforated panel. The one-way vision display panel may further include a releasing layer or a backing layer, or both.

DETAILED DESCRIPTION

U.S. Pat. Nos. 5,830,529; 5,525,177; 5,609,938; and 5,773,110, incorporated herein by reference in their entirety, describe or relate to one-way vision display panels.

Figure 1:
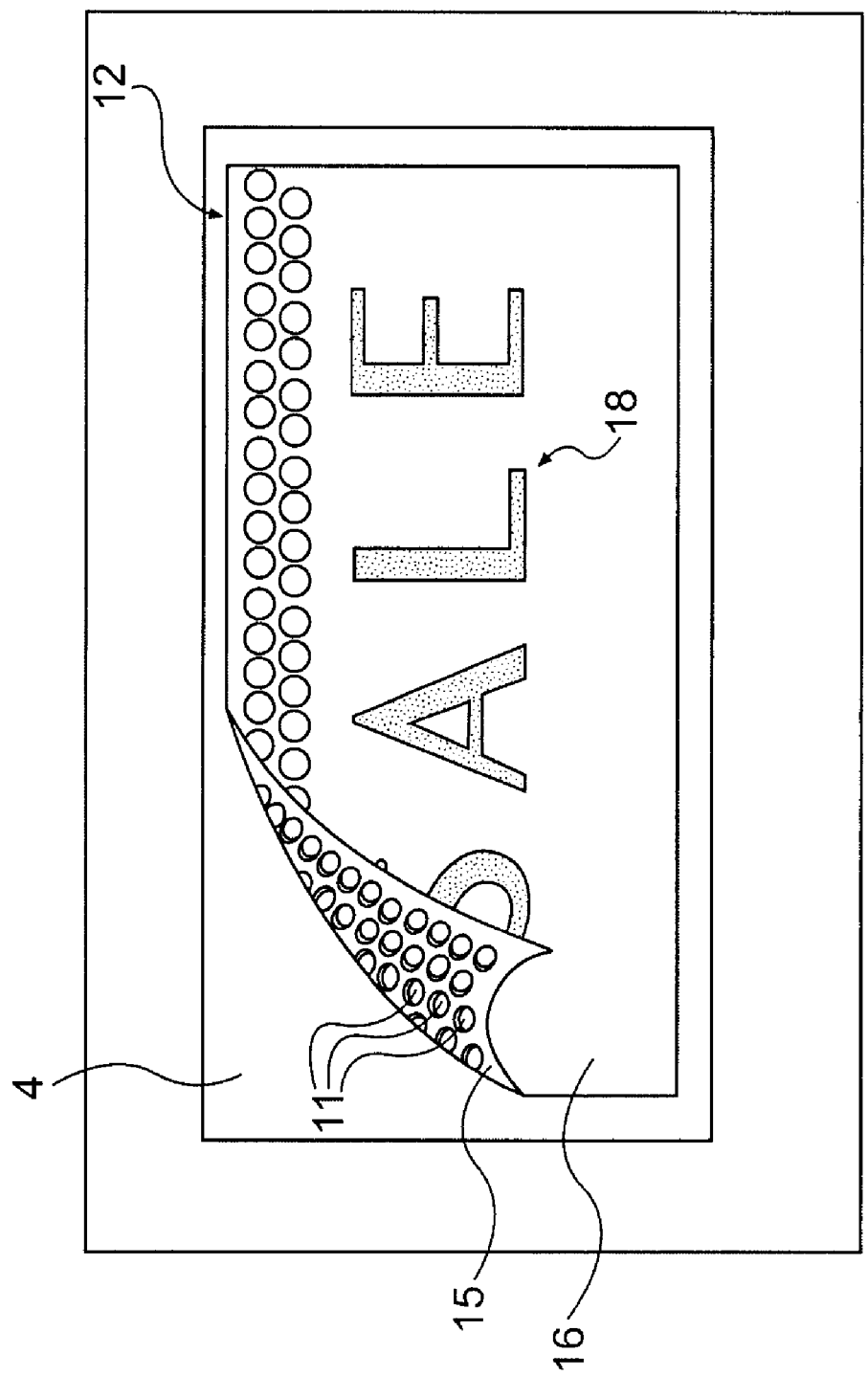
FIG. 1 illustrates a one-way vision display panel, printed with an image, being applied to a window.

FIG. 1 is a front elevational view of a one-way vision image display panel 12 of the type constructed as a perforated material or membrane. In this example, the panel 12 is shown being applied to a surface of a window 4. Although a window is shown, the panel 12 may be attached to any surface. The panel 12 includes a first, light-absorbing layer 15 and/or surface coating 15. The light-absorbing layer 15 may be black, grey, blue, purple, and/or another light-absorbing color. The panel 12 also includes a second, light-reflective layer 16 and/or surface coating 16. The light-reflective layer 16 may be opaque and white, and/or another light-reflective color. In an embodiment, layer 15 may be bonded to layer 16. Optionally or additionally, a perforated material may be coated with light-absorbing material or ink on one side and/or light-reflective material or ink on the other side. A printed image 18 of the word "SALE" is shown printed on the light-reflective layer 16.

The one-way vision display panel 12 may be an "exterior mount" panel. In use, the exterior panel 12 may be applied, for example, to the exterior or outer surface of a window 4 on a building or bus, etc., and the image 18 is only seen by a person when looking at the window 4 from the outside. In an exterior mount panel, layer 15 may be referred to as the "rear" layer or surface and is oriented adjacent the window's exterior surface while the light-reflective layer 16 is the "front" layer or surface as it is the outermost surface of the panel 12. The panel 12 may be made from plastic or another material, such as a flexible material.

The display panel 12 is perforated with a plurality of through-holes 11 which extend completely through the panel 12 from the inner light-absorbing layer 15 to the outer light-reflective layer 16. The through-holes 11 allow viewing through the panel 12 in a direction looking through the window 4 from a position inside of or behind the window 4 without seeing the image 18, printed on the light-reflective surface 16. The image 18 can be viewed by looking at the panel 12 from the opposite direction (i.e., towards the light-reflective surface 16 from a position outside the window 4). The panel 12 may be attached to the window 4 using any technique. For example, the panel 12 may be adhered to the window 4 by an adhesive layer (not shown) which may attach only the solid bar portions of the perforated plastic material to the window 4. Alternatively, the panel 12 may comprise static cling material for adhering the panel 12 directly to a surface without need for an adhesive. The static cling may be provided by the material characteristics, or as a coating, spray, or any combination thereof, that will stick to a surface without need for an adhesive, for example.

Panel 12 may be an "interior mount" one-way vision display panel, mounted on the inside of the window 4. Also, in some cases, the image 18 may be reversed printed so that the image is correctly viewable from the outside. In any case, the panel 12 may be attached to the window 4 using an adhesive, static cling or any other technique. The panel 12 may also be referred to herein as the perforated panel, or as a woven or non-woven panel. In an embodiment, the panel 12 may comprise a clear, transparent material.

Figure 2:
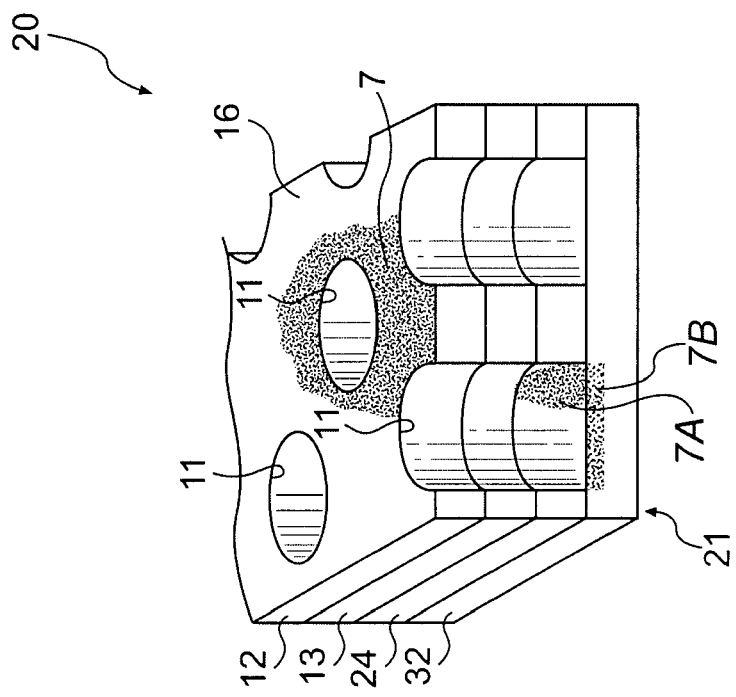
FIG. 2 illustrates a portion of a one-way vision display panel assembly including an ink retention layer.

Although the holes in the perforated panel 12 provide for one-way viewing by permitting light to transmit from one side to the other side, the holes 11, however, cause imaging difficulties, not encountered when printing on the same material without holes. For many types of imaging techniques, if the holes 11 are not covered in some manner on one side, ink, for example, may penetrate through the holes 11 to the printing equipment, or objects, on the other side. For example, residual or leakage ink from the image may enter into the holes 11 and reach the other side of the panel assembly, as shown in FIG. 2. Residual ink can result if the image is, for example, sprayed on or painted on. The residual ink can gather on the backing liner of the panel assembly and/or can weaken the adhesive.

FIG. 2 illustrates a portion of a one-way vision display panel assembly 20, in accordance with an embodiment. Assembly 20 includes panel 12 with front surface 16, which may be used for applying an image. The assembly 20 also includes an adhesive layer 13, a perforated releasing layer 24, and a solid (or non-perforated) ink retention layer 32. Panel 12 may be same as or different from the panel 12 described above.

Once assembly 20 is constructed, an image is applied to the front surface of panel 16. Image substance 7, such as ink, can enter holes 11 as residual or leakage ink 7A, as shown in FIG. 2. Using conventional materials and techniques, the residual ink 7A is not absorbed and may interfere with the printing process, leak onto imaging equipment, obstruct viewing through the panel and/or break down the adhesive used to attach the one-way vision display panel to a window. However, in accordance with an embodiment, a solid (or non-perforated) ink retention layer may absorb and/or retain residual ink that may enter into one or more holes 11 during or after the imaging process. The residual ink 7A, entering into the one or more holes 11, may be quickly absorbed and/or retained by the ink retention layer before the residual ink can dry inside the one or more holes 11 and/or weaken the adhesive. The absorbed or retained residual ink 7B is shown in FIG. 2. The ink retention layer 32 also prevents the residual ink 7A from leaking onto the imaging equipment, other panels or other equipment.

The ink retention layer, as described herein, may be made from any suitable material, such as cellulose, plastic, fibrous material, polyester and/or any combination thereof. The ink retention layer may be a porous, absorbing and/or solid material. The ink retention layer may be heat laminated to the releasing layer or may be attached to the releasing layer using an adhesive. Optionally or additionally, ink retention layer may be attached to the releasing layer using heat lamination, cold lamination, adhesion, pressurization, heat, plastic welding, electric welding, and/or any combination thereof. The ink retention layer may also include a light reflective material that can be readily sensed by imaging or manufacturing equipment. If a transparent material is used for the ink retention layer, ink, coatings, or other techniques may be used so that printing equipment sensors can detect the assembly including a transparent ink retention layer. Many of these printing machines have sensors that detect the beginning and the end of the printing material or substrate to define the limits where the ink or coating may be applied so that the printing inks are not sprayed over the machine.

The ink retention layer, as described herein, may retain, absorb, attract, and/or capture residual ink. Unless indicated otherwise, as used herein, the term "retain" means to retain, absorb, attract, and/or capture.

In an embodiment, a solid ink retention layer 32 may be at least partially transparent or may be colored. Such color may be a light-reflective color or white, so the presence of the liner may be read by suitably equipped printing or manufacturing machines for the purpose of defining the position of the printing material on the printing or manufacturing machine.

In addition, the ink retention layer may include a rear gripping surface 21 that can temporarily grip, improve surface tension, reduce slippage during movement, aid machine material transport, or attach to the printing equipment so that the one-way vision panel assembly does not move or shift during the manufacturing, imaging or installation, for example. The gripping surface 21 may also provide the one-way display panel with improved handling. The gripping surface 21 may include a surface treatment that could be achieved by methods such as embossing or molding and the like, and by providing either a coating or a texture to the ink retention layer 32 rear surface, so as to provide improved traction on printing machines, such as those fed by a roller.

The ink retention layer, in accordance with an embodiment, may provide increased vision display panel assembly stability, improved material handling, material cleanness, equipment protection, machine sensor readability, and ink or coating positioning and absorption. The ink retention layer collects, retains and/or absorbs inks or coatings in position while printing, drying or handling.

The releasing layer 24 permits or aids the removal of the ink retention layer 32 from the adhesive layer 13. The releasing layer, as described herein, may be made from paper, silicone, polyester, wax and polymeric plastics, other suitable material, or any combination thereof.

As used herein, the terms "image," "imaging process," "coat," "coating," "imaging," "imaging material," "ink," "print," "printed," "printing," "apply an image," "apply," "applied," "paint," "painting," "painted" or similar terms, include, but are not limited to, any product and means or method of applying or positioning a visible layer, typically of one or more colors, onto or in close proximity to at least a part of one surface of a one-way vision assembly material, usually the panel, and can include hand application, such as brush, air brush, roller, spray, and the like; or machine type applications such as screen print, lithography, transfer, offset, ink jet, paint jet, digital printing, sublimation, spraying, electrostatic transfer (e.g., using a transfer medium), magnetic transfer, powder transfer, vapor deposition, gravity, liquid flow, blade coating, reverse roll coating and the like.

The term "hole" or "holes" or similar, as used herein, includes, but is not limited to, any space which allows light or substances to transfer from one side of a material to the other, at any time during the manufacturing process or when in use. A hole may be made, for example, by removal of part of the material, such as by perforating, punching, die cutting, melting and the like. This may be done by reciprocating or rotary perforating machines or die cutting machines or use of laser, or use of heat, or combinations of any of these, to cause removal of material to create a hole. A hole may also be made by molding or forming the material to leave areas without material, or by manufacturing of structures to create areas without material, such as by weaving or bonding. Such materials known as woven, non-woven, fabric reinforced, mesh, grid, filigree, etc. may be used for a one-way vision display panel. The term "perforate", "perforated", "perforating" or similar, as used herein, includes, but is not limited to, any means of creating a hole and includes punching, molding, weaving, shaping, forming, and the like, the result of which provides a void or light transmissive part of a material, panel, assembly and similar.

The material used for the perforated panel or display panel, as used herein, may refer to plastic, polyester or other material (e.g., flexible material) with square, round, oval, triangular or other shaped perforations, or the perforated material may refer to woven mesh material, non-woven mesh material, or any combination thereof. As stated above, the perforated material may comprise static cling material, or may be coated or sprayed with a static cling material. In an embodiment, the perforated panel may comprise a transparent, clear material. The perforated material may be layered or coated as described herein.

Figure 3:
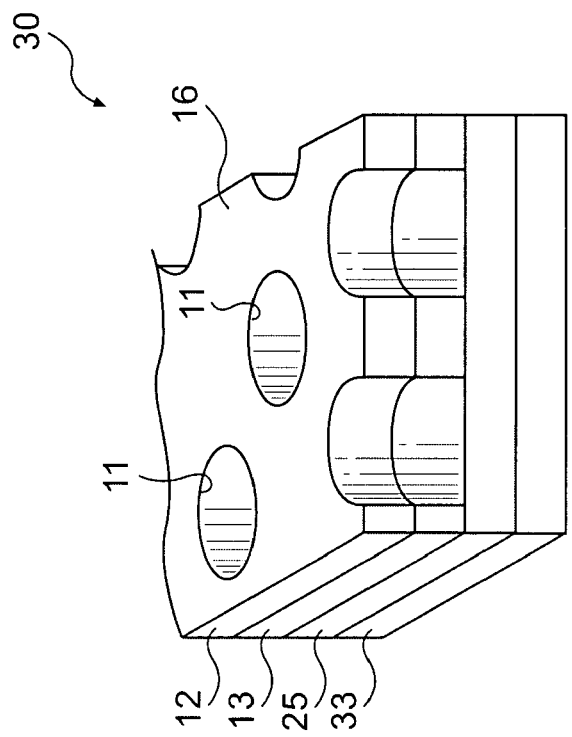
FIG. 3 illustrates a portion of a one-way vision display panel assembly including an ink retention layer and a solid releasing layer.

FIG. 3 illustrates a portion of a one-way vision display panel assembly 30, in accordance with an embodiment. Assembly 30 includes panel 12 with front surface 16. The assembly 30 also includes an adhesive layer 13, a solid (or non-perforated) releasing layer 25, and an ink retention layer 33. Panel 12 may be same as or different from the panel 12 described above.

In accordance with an embodiment, the non-perforated releasing layer 25 may be a porous material that permits the residual ink (not shown) to pass through the releasing layer 25 to the ink retention layer 33, where it is absorbed and/or retained. The non-perforated releasing layer 25 may be made from porous material, such as plastic, polyester, or other porous material. As described above, the ink retention layer 33 may be heat laminated to the releasing layer 25, may be attached to the releasing layer 25 using an adhesive, or attached by another technique(s) as described above.

In an embodiment, the ink retention layer may be, for example, a fibrous, cellulose, plastic and/or polyester material, and the releasing layer may be a coating or a layer that is applied (e.g., sprayed, brushed, etc.) onto the ink retention layer. In this case, the releasing layer may permit removal from an adhesive or other surface while permitting the residual ink to pass through to the ink retention layer.

Figure 4:
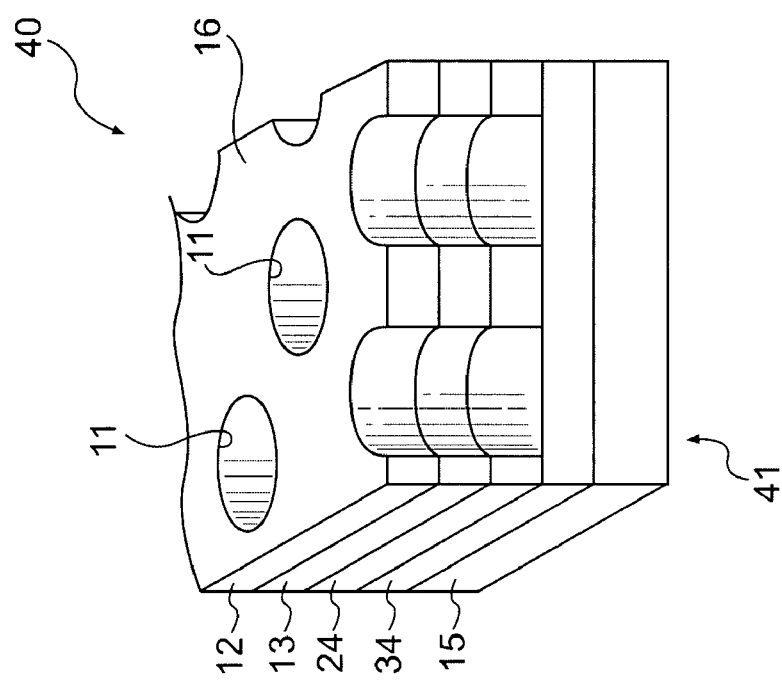
FIG. 4 illustrates a portion of a one-way vision display panel assembly including an ink retention layer and a backing layer.

FIG. 4 illustrates a portion of a one-way vision display panel assembly 40, in accordance with an embodiment. Assembly 40 includes panel 12 with front surface 16. The assembly 40 also includes an adhesive layer 13, a perforated releasing layer 24, an ink retention layer 34, and a solid backing layer 15. Panel 12 may be same as or different from the panel 12 described above.

The solid backing layer 15 is attached to the ink retention layer 34. The solid backing layer 15 may be attached to the ink retention layer 34 using heat lamination, cold lamination, adhesion, pressurization, heat, plastic welding, and/or electric welding. Optionally or additionally, the solid backing layer may be coated onto the ink retention layer, or vice versa. The solid backing layer, as described herein, may be made of plastic, paper, polyester, other suitable material or any combination thereof. The releasing layer 24 permits or aids removal of the ink retention layer 34 and the solid backing layer 15 from the adhesive layer 13. The solid backing layer 15 may include a gripping surface 41 that can temporarily grip or attach to the printing equipment so that the one-way vision panel assembly does not move or shift during the manufacturing, or imaging process, for example. The gripping surface may also provide the one-way display panel with improved handling. The gripping surface 41 may include a surface treatment that could be achieved by methods such as embossing or molding and the like, and by providing either a coating or a texture to the solid backing layer 15 rear surface, so as to provide improved traction on printing machines, such as those fed by a roller.

Figure 5:
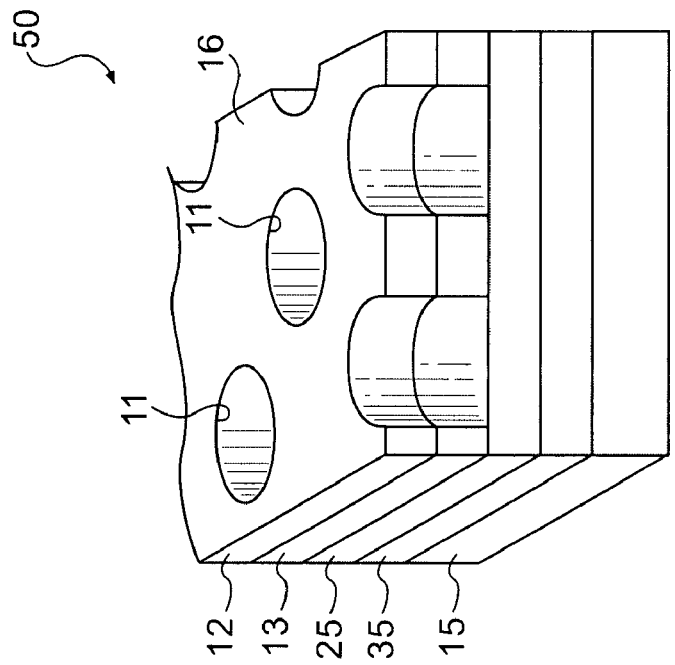
FIG. 5 illustrates a portion of a one-way vision display panel assembly including a solid releasing layer, an ink retention layer and a backing layer.

FIG. 5 illustrates a portion of a one-way vision display panel assembly 50, in accordance with an embodiment. Assembly 50 includes panel 12 with front surface 16. The assembly 50 also includes an adhesive layer 13, a non-perforated releasing layer 25, an ink retention layer 35, and a solid backing layer 15. Panel 12 may be same as or different from the panel 12 described above.

As described above, the non-perforated releasing layer 25 is a porous material that permits the residual ink (not shown) to flow through the releasing layer 25 to the ink retention layer 35, where it is absorbed and/or retained. As described above, the ink retention layer 35 may be heat laminated to the releasing layer 25, may be attached to the releasing layer 25 using an adhesive, or attached by another technique(s) as described above.

Figure 6:
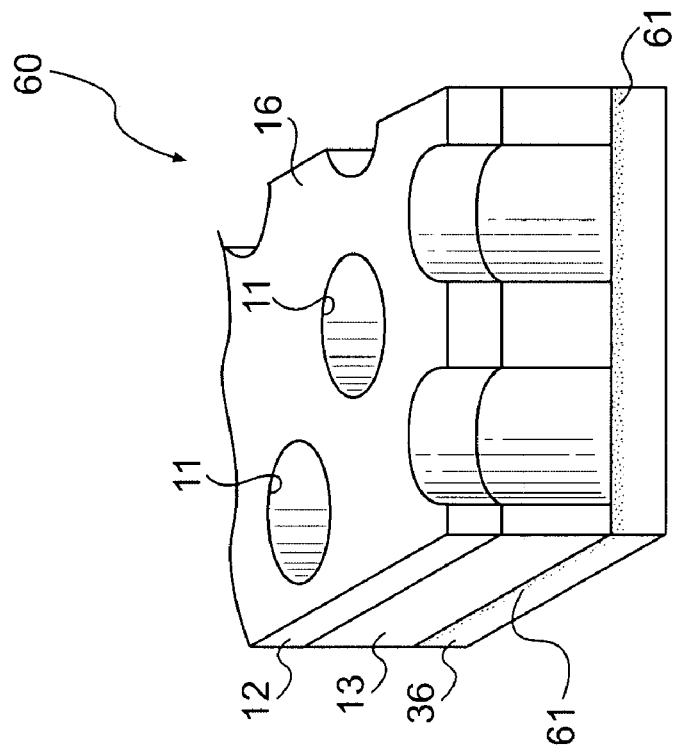
FIG. 6 illustrates a portion of a one-way vision display panel assembly including an ink retention layer adjacent to an adhesive layer.

FIG. 6 illustrates a portion of a one-way vision display panel assembly 60, in accordance with an embodiment. Assembly 60 includes panel 12 with front surface 16. As shown, the ink retention layer 36 is adjacent to the adhesive layer 13. Panel 12 may be same as or different from the panel 12 described above.

In accordance with an embodiment, the ink retention layer 36 may include all the properties of the ink retention layers described above, and in addition my also include properties of the releasing layers. For example, the ink retention layer 36 may be, for example, a fibrous, cellulose, plastic and/or polyester material, and the releasing layer 61 may be a coating or a layer that is applied (e.g., sprayed, brushed, etc.) onto the fibers of ink retention layer. In this case, the releasing layer 61 may permit removal of the ink retention layer 36 from the adhesive 13 while permitting the residual ink to pass through to the ink retention layer 36. The releasing layer coating 61 may be, for example, a silicone coating, polyester coating, wax coating and/or a polymeric plastics coating, or other substances which release from the adhesive 13.

Figure 7:
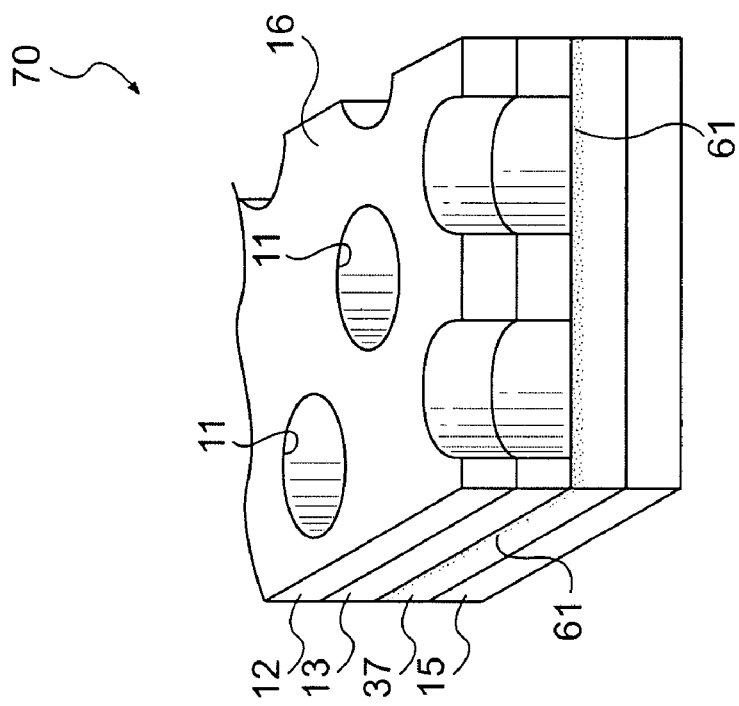
FIG. 7 illustrates a portion of a one-way vision display panel assembly including an ink retention layer, adjacent to an adhesive layer, with a backing layer.

FIG. 7 illustrates a portion of a one-way vision display panel assembly 70, in accordance with an embodiment. Assembly 70 includes panel 12 with front surface 16. Panel 12 may be same as or different from the panel 12 described above. As shown, the ink retention layer 37 is adjacent to the adhesive layer 13. As described above, the ink retention layer 37 may be, for example, a fibrous, cellulose, plastic and/or polyester material, and the releasing layer 61 may be a coating or a layer that is applied (e.g., sprayed, brushed, etc.) onto the fibers of ink retention layer. Assembly 70 also includes a solid backing layer 15 attached to the retention layer 37. The backing layer 15 may include all the properties and characteristics of the solid backing layers described above.

Figure 8:
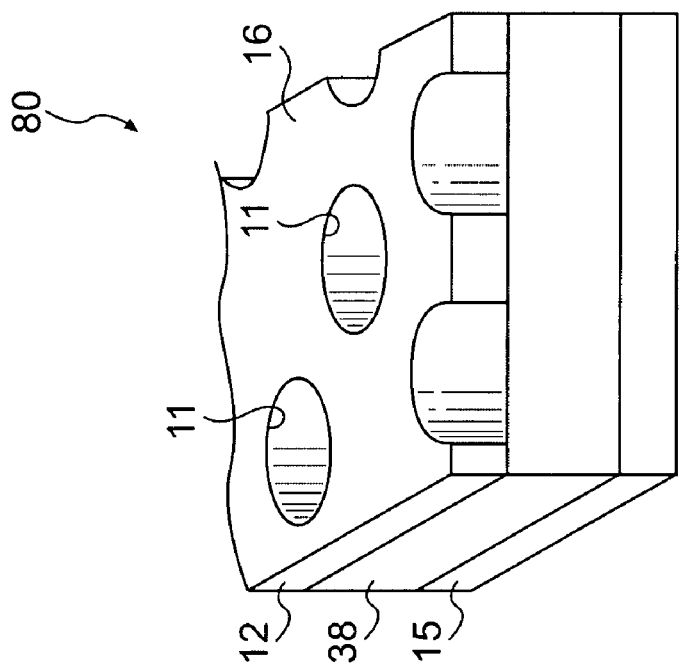
FIG. 8 illustrates a portion of a one-way vision display panel assembly including an ink retention layer, with a backing layer, adjacent to the printing panel.

FIG. 8 illustrates a portion of a one-way vision display panel assembly 80, in accordance with an embodiment. Assembly 80 includes panel 12 with front surface 16. Panel 12 may be same as or different from the panel 12 described above. As shown, assembly 80 includes an ink retention layer 38 adjacent to the panel 12. Assembly 80 also includes a solid backing layer 15 attached to the retention layer 38. The backing layer 15 may include all the properties and characteristics of the solid backing layers described above.

In accordance with an embodiment, the ink retention layer 38 may include all the properties of the ink retention layers described above. In addition, the ink retention layer 38 may contain an adhesive, static cling capabilities or similar properties that permit the ink retention layer 38 to removably attach to the panel 12.

Figure 9:
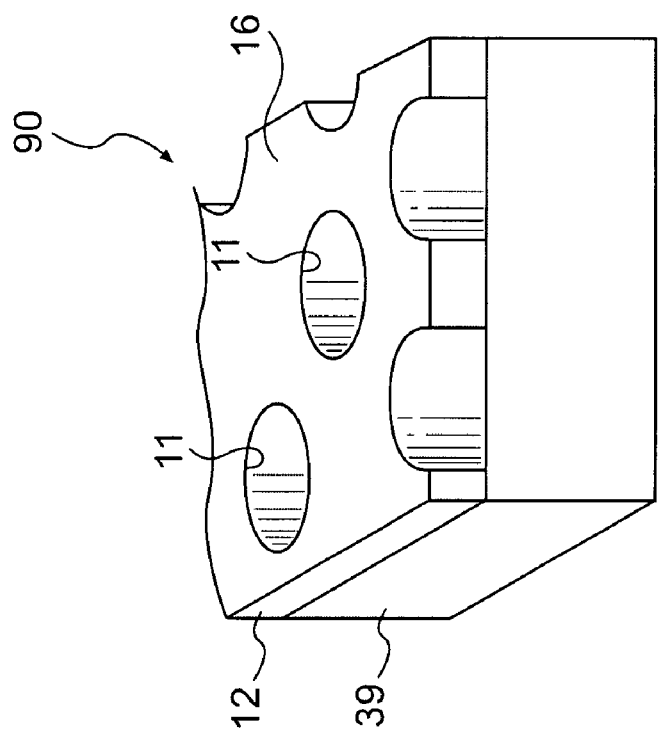
FIG. 9 illustrates a portion of a one-way vision display panel assembly including an ink retention layer adjacent to the printing panel.

FIG. 9 illustrates a portion of a one-way vision display panel assembly 90, in accordance with an embodiment. Assembly 90 includes panel 12 with front surface 16. Panel 12 may be same as or different from the panel 12 described above. As shown, assembly 90 includes an ink retention layer 39 that is directly attached to the panel 12.

In accordance with an embodiment, the ink retention layer 39 may include all the properties of the ink retention layers described above. In addition, the ink retention layer 39 may include properties of the solid backing layers, as described above. For example, the ink retention may include a static cling material or coating and/or may include a gripping surface.

Once an image is printed on panel 12 of, for example, one of the assemblies 20-90, shown in FIGS. 2-9, respectively, the panel 12 with or without adhesive layer 13, and/or backing layer 15, is separated from the ink retention layer. The retained ink 7B is retained or absorbed by the ink retention layer, such as shown in FIG. 2, is removed from the panel 12. The panel 12 including, for example, an adhesive layer 13 or with static cling properties is then placed against the installation surface, for example, a window 4, as shown in FIG. 1. The image printed on the panel is visible from at least one side of the assembly after installation. If the panel assembly 20-90 is configured as an "interior mount" assembly, then the panel 12 may be attached inside the window 4.

In an embodiment, the panel assemblies including panel 12 can be protected by the use of a laminating-type of material which may be applied against the image, such as image 18 shown in FIG. 1, and also over the holes 11. Overlaminate or clear laminate, provide protection from the elements, weathering, cleaning chemicals, ultraviolet and the like and also aid in providing in sealing against water, dirt and the like and also aid handling during the installation process to provide more stability to the film after removal of the substrate 12 and the adhesive layer, if present, from the other liners and layers, including the retention layer, as present in this invention.

The above described panel assembly configurations including the ink retention layer separate or isolate the residual or leakage ink, that may include solvents or other chemicals within the ink, which can be harmful to the panel or adhesive layers, from the adhesive and/or panel layer. This separation may be achieved by space between the two layers and can include means to stop the ink moving across the space to the adhesive layer, such as can occur during printing and handling. This means that the solvents and chemicals in the ink can be isolated and contained and controlled during and after the printing process. The panel assembly that results, in accordance with an embodiment of the invention, provides a one-way vision display panel that may retain better adhesion levels on application and can also maintain the necessary stability for printing and handling.

In addition, the residual ink, without an the ink retention layer, can gather and dry in the holes of the perforated assemblies. After the assembly is completed and rolled or removed from the printing machine, the dried ink may release as debris. This debris can contaminate the material, including the image and adhesive layer, if present. Having an ink retention layer, in accordance with an embodiment, the residual ink, that enter the holes, will remain in position to present a more complete image when viewed from the image side until the backing layer with the ink retention layer is removed. The ink coating absorbed and/or retained by the ink retention layer will be removed with the backing layer to achieve a better one-way vision effect.

Figure 10:
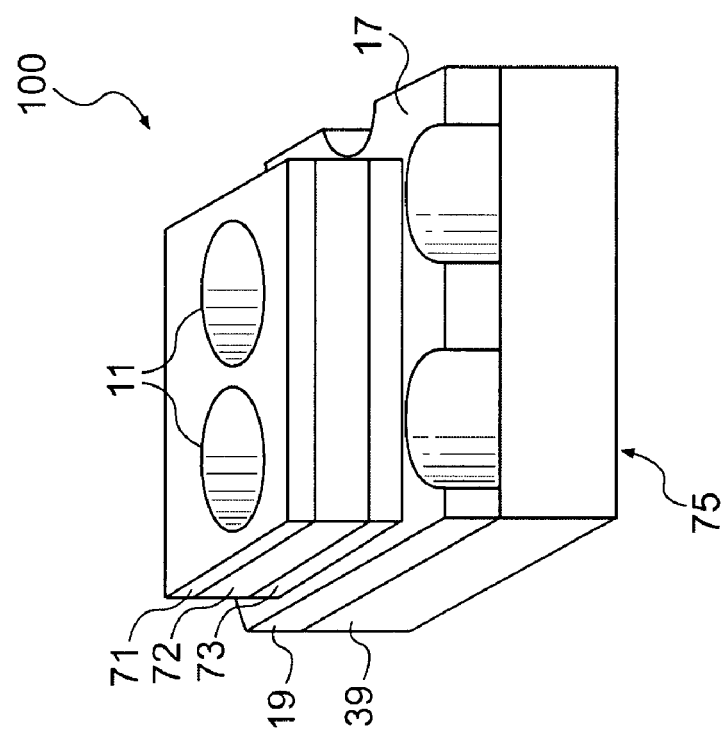
FIG. 10 illustrates a portion of a vision display panel assembly including multi-layered images and including an ink retention layer.

FIG. 10 illustrates a portion of a vision display panel assembly 100, in accordance with an embodiment. Assembly 100 includes the same underlying configuration as assembly 90 in FIG. 9.

Assembly 100 includes panel 19 with front surface 17, an ink retention layer 39 that is adjacent to the panel 19. Panel 19 may include some if not all of the properties of panel 12, described above. Assembly 100 may include a gripping surface or layer 75.

The assembly 100 may also include a backing layer 15, as shown in FIG. 8. Panel 19 may include a static cling-type material or coating (as described above) to provide temporary bonding to other smooth surfaces such as glass or plastics. If the printable panel 19 is at least partially transparent, then images may be printed that face in one or both directions when the display panel is installed on see through materials, such as windows. This is done by printing image 73 in one orientation on the front surface 17 of panel 19. A light barrier layer 72 may be printed on image 73. Light barrier layer 72 may include a white layer, a black layer, and a white layer, to provide a white layer facing in each direction so that the applied image appears clear, and the black layer is between the white layers to provide opacity, so that a viewer does not see the image on the opposite side. Then image 71 is applied in a second orientation, which is the opposite orientation to printing image 73. The ink retention layer such as layer 39 absorbs or retains the residual ink that may leak through holes 11 during the application of the images and layers 71, 72 and 73. If only one printing image is required, then selecting the orientation of either printing image 73 or 74 will provide a panel which may be viewed from one side only.

Figure 11:
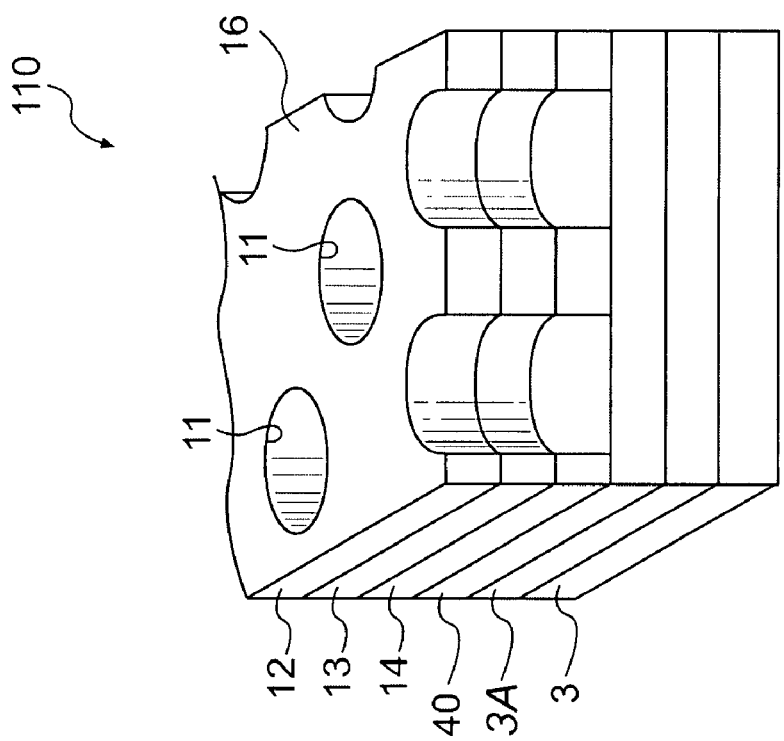
FIG. 11 illustrates a portion of a one-way vision display panel assembly including an ink retention layer and multiple stabilizing layers.

FIG. 11 illustrates a portion of a one-way vision display panel assembly 110, in accordance with an embodiment. Assembly 110 includes panel 12 with front surface 16. The assembly 110 also includes an adhesive layer 13, a perforated releasing layer 14, an solid ink retention layer 40, a second adhesive layer 3A and backing layer 3. Panel 12 may be same as or different from the panel 12 described above.

Assembly 110 illustrates the use of two separate layers, such as releasing layer 14 and backing layer 3, that strengthen and stabilize the assembly 110. Whether the layers are identical or one layer is, for example, a retention layer, and the other is the stabilizing layer, the layers may be placed such that their longitudinal strength is in directions that are not aligned. For example, backing layer 3 may have a direction of stability which can be aligned in the direction different to that of layer 14 or the retention layer 40 so that the assembly gains strength from the sub-assembly and provides a more stable or stay-flat structure to aid in printing, handling, shipping and the like.

As described herein, perforated panels 12 and/or 19, as shown in FIG. 10, may comprise a single material or a multi layer material bonded together. The panels may include, for example, a light reflective layer (e.g., white) on one side with a light absorbing (e.g., black) layer on the other. The panels may include one or more coatings or layers that may aid ink adhesion, seal the material, improve bonding to adhesive, if present, provide a light reflective or light absorbent surface or layer. In some cases, the panels may be at least partially transparent or at least partially opaque.

Figure 12:
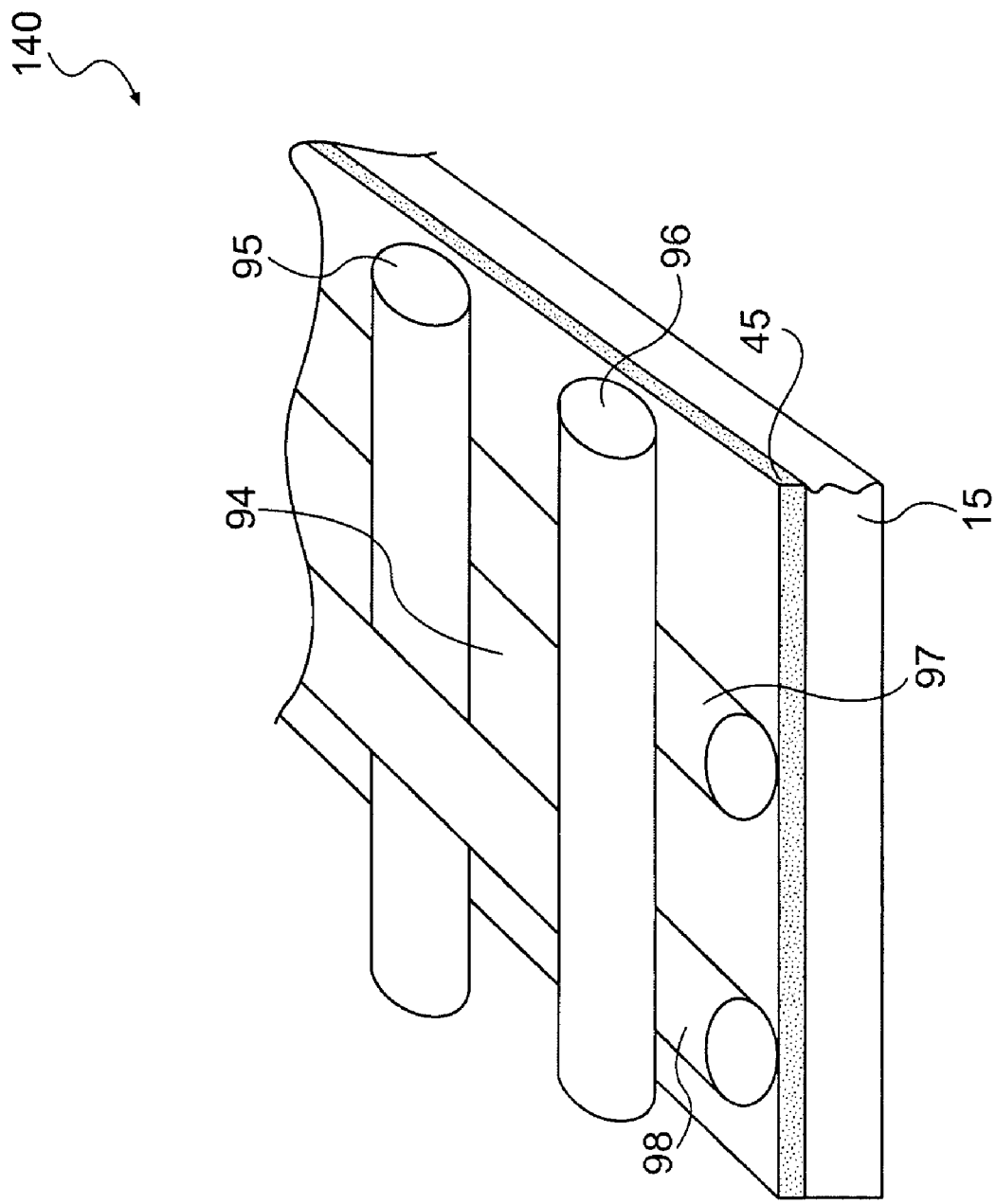
FIG. 12 illustrates a perforated panel configured as a woven and/or non-woven mesh.

FIG. 12 shows a portion of a perforated panel (e.g., panel 12 or 19) configured as a woven or non-woven mesh. As shown, assembly 140 includes a mesh made from fibers 95, 96, 97 and 98 of any suitable material such as plastics, polyester, cotton, artificial fibers or the like. The fibers may be non-woven and layered on top of each other, such as fibers 96, 97 and 98, or the fibers may be woven into each other, such as fibers 95, 97 and 98. A combination of woven and non-woven fibers may also be used to configure the perforated panel or mesh. The holes 94 permit through viewing and the image may be printed on the surface of the fibers 95, 96, 97 and 98 of the mesh. The assembly 140 may include backing layer 15 including an ink retention layer 45 to absorb or retain any residual ink from the image applied to the surface of the fibers 95, 96, 97 and 98 of the mesh. The ink retention layer 45 may include a coating or layer that acts as a releasing material (e.g., silicone, wax, etc.) (not shown). The backing layer may be attached to the ink retention layer using the technique(s) described above. The ink retention layer may be attached to the mesh using the techniques described above.

As described herein, the ink retention layers such as 32, 33, 34, 35, 36, 37, 38, 39, 40 and or 45 may be made from, for example, cellulose, polyester, plastic, paper, fibrous materials or any combination thereof. Material used to manufacture the perforated panel may also be used to make the ink retention layer so that inks suitable to print on the perforated panel will be compatible with the ink retention layer.

Each embodiment of the vision display panel assemblies 20-110 and 140 may include a gripping surface on the ink retention layer surface or a backing layer surface so that it can temporarily grip or attach to a surface, as described above.

Printing on the retention layers, such as layers 32-40 and 45, or on the backing layers or liners can be done for any reason, such as applying a brand, logo, product identification or any other reason. The printing may be done on the back of the layer, or on the retention layer 33. If the layer is partially transparent, then this printing may be done on the layer surface adjacent the retention layer, so that it will be visible through the backing or retention layer, and may be visible through the holes from the other side.

If a backing liner with ink retention layer is selected, and if ink penetrates the holes of the perforated assembly in sufficient quantity to produce a usable image on the ink retention layer, then upon removal of the combination from the perforated panel, a second usable material is produced. This material would be the ink retention layer (with a backing liner) without holes and would have dots representing an image. This image comprising dots made by the residual ink, placed in the holes of the perforated material, was captured by the ink retention layer. This means it is possible to produce two imaged materials from one printing. The first would have holes and the second (backing layer with ink retention layer) would not have holes.

Figure 13:
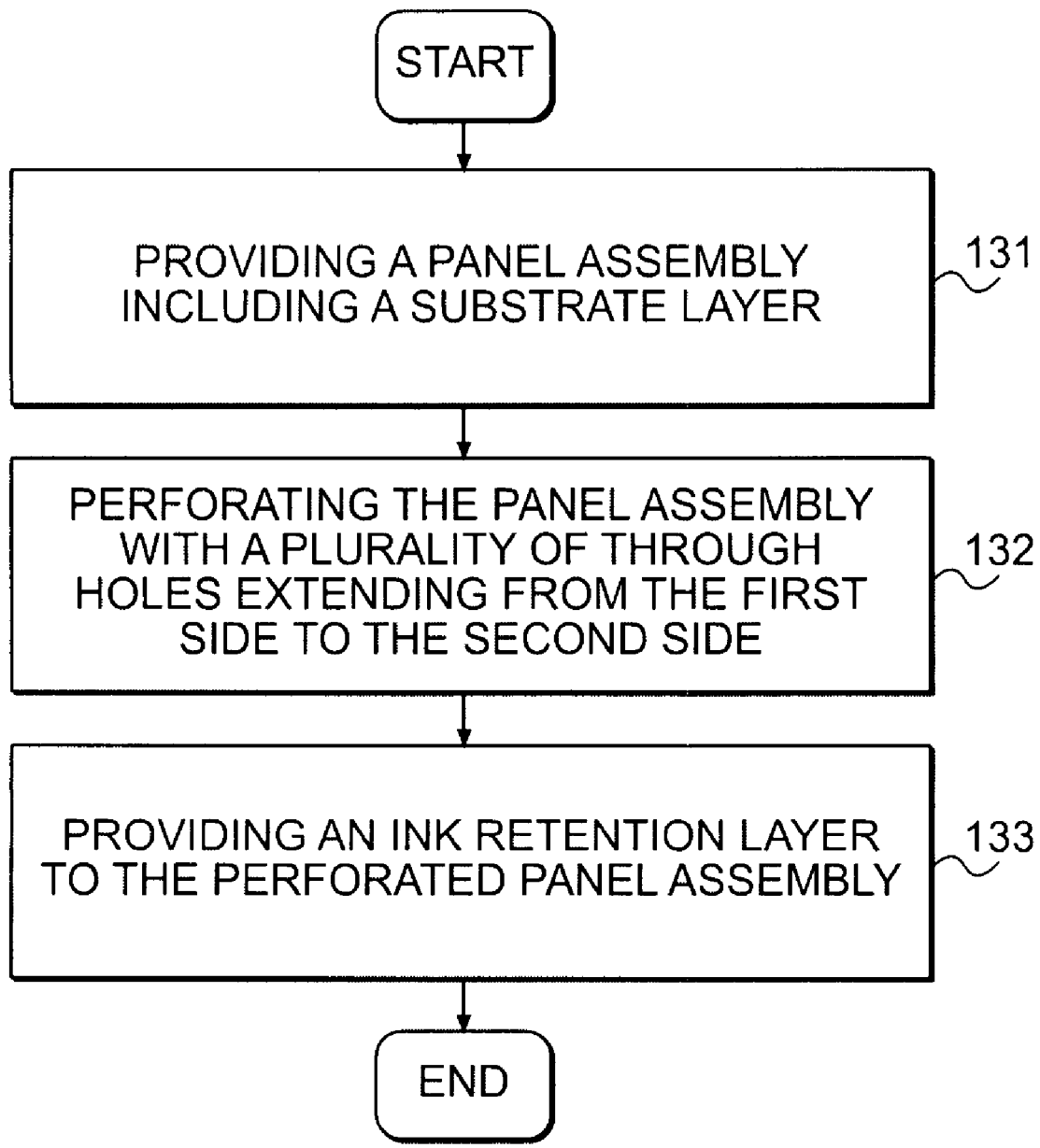
FIG. 13 is a flow chart illustrating a method of forming a one-way vision display panel, in accordance with an embodiment.

FIG. 13 is a flow chart illustrating a method of forming a one-way vision display panel, in accordance with an embodiment. As shown in box 131, a panel assembly including a substrate layer is provided. The panel assembly has a first side and a second side. The panel assembly is perforated with a plurality of through holes extending from the first side to the second side of the panel assembly, as shown in box 132. As shown in box 133, an ink retention layer is provided to the perforated panel assembly. The ink retention layer is to retain or absorb residual ink.

In an embodiment, an adhesive layer may be provided adjacent to the substrate layer. In addition, a releasing layer is provided adjacent to the adhesive layer. The adhesive layer is disposed between substrate layer and the releasing layer and the releasing layer is disposed between the adhesive layer and the ink retention layer. A solid backing layer, which is adjacent to the ink retention layer may also be provided.

A solid backing layer may be provided to the perforate panel assembly. The solid backing layer may include an ink retention layer (as described above). The solid backing layer with the ink retention layer may be attached to the second side of the panel assembly. Optionally, an ink retention layer may be first attached to the perforated panel assembly and then the solid backing layer may be subsequently attached to the ink retention layer.

Figure 14:
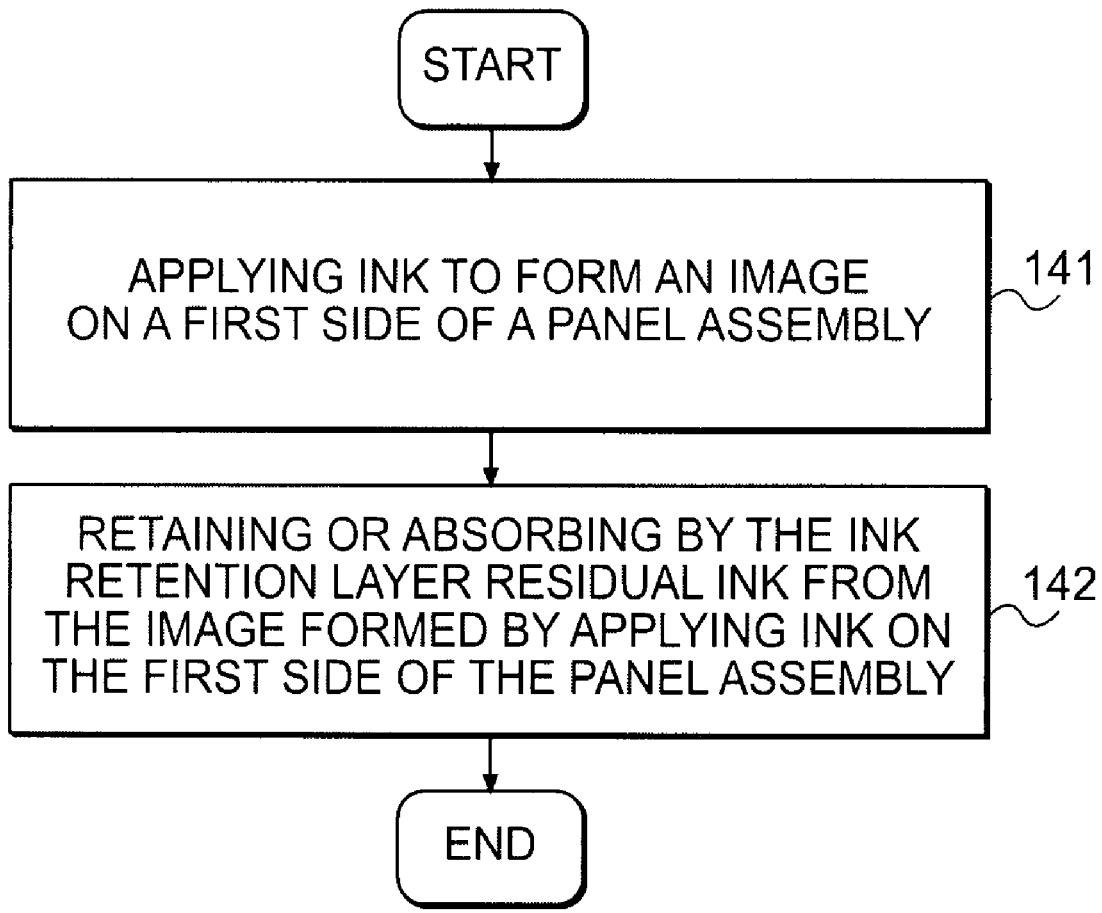
FIG. 14 is a flow chart illustrating a method of using a one-way vision display panel, in accordance with an embodiment.

FIG. 14 is a flow chart illustrating a method of using a one-way vision display panel, in accordance with an embodiment. As shown in box 141, ink is applied on a first side of a panel assembly to form an image. The panel assembly also includes a second side and an ink retention layer adjacent to the second side of the panel assembly. The ink retention layer retains or absorbs residual ink from the image formed by applying ink on the first side of the panel assembly, as shown in box 142.

Figure 15:
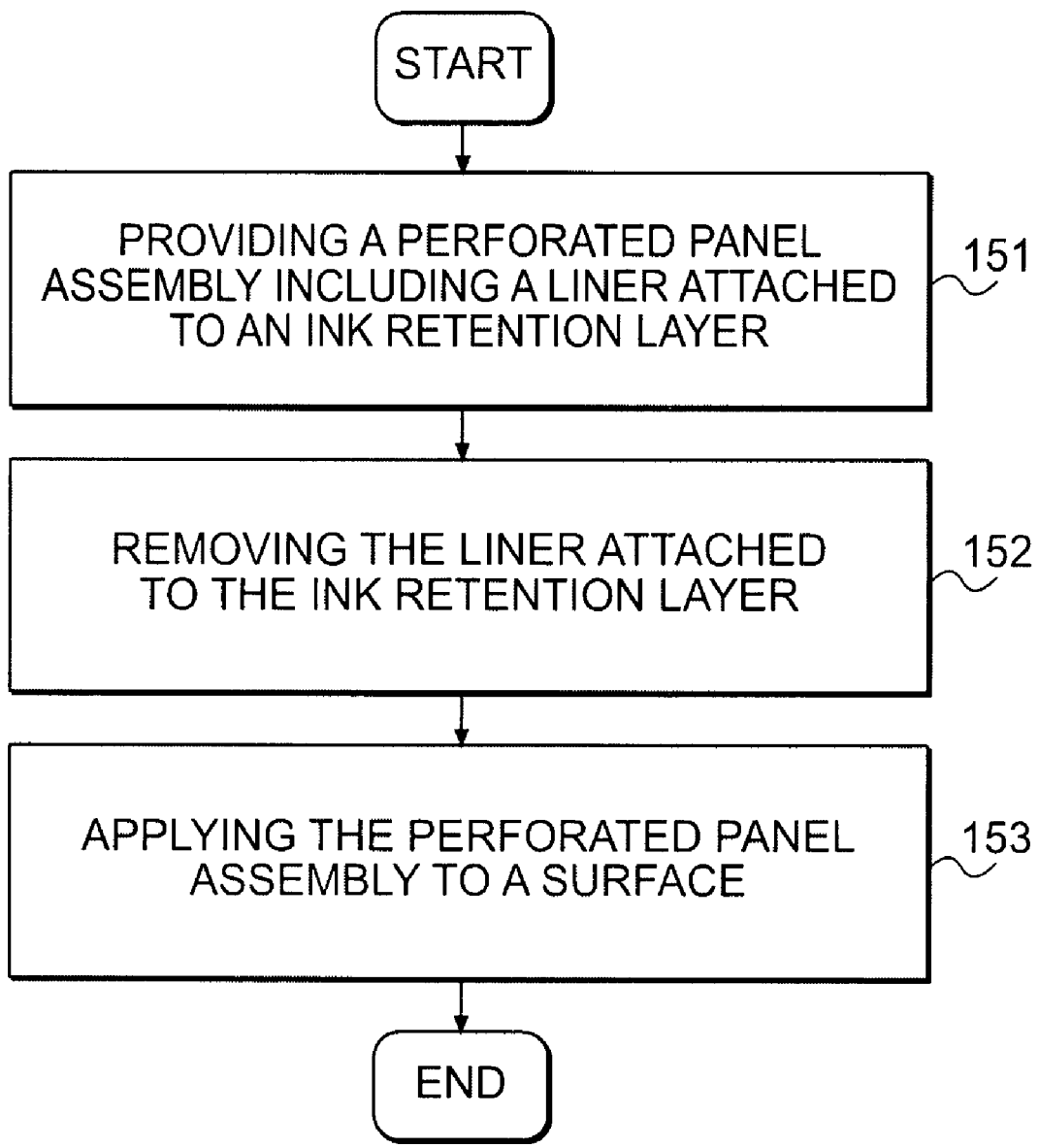
FIG. 15 is a flow chart illustrating a method of applying a one-way vision display panel assembly, in accordance with an embodiment.

FIG. 15 is a flow chart illustrating a method of applying a one-way vision display panel assembly, in accordance with an embodiment. As shown in box 151, a perforated panel assembly including a liner attached to an ink retention layer is provided. The perforated panel assembly includes an image applied on a front surface of the assembly. The liner attached to the ink retention layer is removed, as shown in box 152. The ink retention layer retains or absorbs residual ink from the image applied on the front surface of the perforated panel assembly. The perforated panel assembly is applied to a surface after the liner and the ink retention layer are removed, as shown in box 153.

Characteristics, properties or processes described with respect to a component, material or process of one-way vision display panel and/or assembly (e.g., the panels and/or assemblies shown in the figures and described above), may be included in another component, material or process of a different one-way vision display panel and/or assembly.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A one-way vision display panel assembly, comprising:
   a perforated panel formed of a flexible material, the perforated panel having a front surface and a rear surface;
   an adhesive layer attached to the rear surface of the perforated panel;
   a releasing layer having a front surface and a rear surface, wherein the adhesive layer is disposed between the rear surface the perforated panel and the front surface of the releasing layer, wherein a plurality of through holes extend from the front surface of the perforated panel through to the rear surface of the releasing layer;
   a second adhesive layer containing an adhesive substance; and
   an ink retention layer attached to the releasing layer using the adhesive substance of the second adhesive layer, wherein the releasing layer is disposed between the perforated panel and the ink retention layer, wherein the ink retention layer is separate from the second adhesive layer, and wherein the ink retention layer is a solid layer comprising a material that retains or absorbs residual ink from an image applied to the front surface of the perforated panel.

2. The one-way vision display panel of claim 1, wherein the releasing layer is selected from the group consisting of paper, silicone, polyester, wax and polymeric plastics.

3. The one-way vision display panel of claim 1, wherein the ink retention layer comprises one or more material selected from the group consisting of solid material, porous material, light reflective material, cellulose, polyester, plastic, and fibrous material.

4. The one-way vision display panel of claim 1, wherein the ink retention layer isolates the residual ink from the adhesive layer.

5. The one-way vision display panel of claim 1, wherein the ink retention layer comprises a first surface attached to the releasing layer and a second surface that includes a gripping surface that is in direct contact with printing equipment during a printing process and is manufactured or surface treated to increase traction to the printing equipment.

6. The one-way vision display panel of claim 1, wherein the ink retention layer is attached to the releasing layer by attachment means selected from the group consisting of heat lamination, cold lamination, adhesive, pressurization, heat, plastic welding, and electric welding.

7. The one-way vision display panel of claim 1, wherein the releasing layer comprises a non-perforated, porous material and wherein the releasing layer permits the residual ink to contact the ink retention layer.

8. The one-way vision display panel of claim 7, wherein the releasing layer comprises a material applied to the ink retention layer and wherein the material is selected from the group consisting of paper, silicone, polyester, wax and polymeric plastics.

9. The one-way vision display panel of claim 1, wherein the plurality of through holes extend through the releasing layer and permit the residual ink to contact the ink retention layer.

10. The one-way vision display panel of claim 1, further comprising:
a solid backing layer, wherein the ink retention layer having a first surface and a second surface and wherein the releasing layer is attached to the first surface of the ink retention layer and the solid backing layer is attached to the second surface of the ink retention layer.

11. The one-way vision display panel of claim 10, wherein the solid backing layer is attached to the ink retention layer by attachment means selected from the group consisting of heat lamination, cold lamination, adhesive, pressurization, heat, plastic welding, electric welding and a coating.

12. The one-way vision display panel of claim 10, wherein the ink retention layer is a coating applied to the solid backing layer.

13. The one-way vision display panel of claim 1, further comprising:
a solid backing layer, wherein the solid backing layer comprises a first surface attached to or coated with the retention layer and a second surface that includes a gripping surface that is in direct contact with printing equipment during a printing process and is manufactured or surface treated to increase traction to the printing equipment.

14. The one-way display panel of claim 1, further comprising:
a first image layer printed on the front surface of the perforated layer;
a light barrier applied on the first image layer; and
a light absorbent layer applied to the light barrier.

15. The one-way display panel of claim 1, further comprising:
a first image layer printed in a first orientation on the front surface of the perforated layer;
a light barrier applied on the first image layer;
a second image layer printed in a second orientation on the light barrier, wherein the second orientation is opposite to the first orientation.

16. The one-way vision display panel assembly of claim 1, wherein the perforated material is selected from the group consisting of static cling material, plastic material, woven mesh material, and non-woven mesh material.

17. The one-way vision display panel of claim 3, wherein the ink retention layer comprises a light reflective material.

* * * * *

UNITED STATES PATENT AND TRADEMARK OFFICE
CERTIFICATE OF CORRECTION

PATENT NO.         : 7,897,230 B2                                  Page 1 of 1
APPLICATION NO.    : 11/790972
DATED              : March 1, 2011
INVENTOR(S)        : Gregory Ross It is certified that error appears in the above-identified patent and that said Letters Patent is hereby corrected as shown below:

In the Claims:

Column 10, Claim 1, Line 62 Please delete the words "retains or"

Signed and Sealed this
Seventeenth Day of April, 2012

David J. Kappos
*Director of the United States Patent and Trademark Office*